United States Patent
Ko et al.

(10) Patent No.: US 10,953,720 B2
(45) Date of Patent: Mar. 23, 2021

(54) AIR CONDITIONER FOR VEHICLE

(71) Applicant: HANON SYSTEMS, Daejeon (KR)

(72) Inventors: Jae Woo Ko, Daejeon (KR); Seong Seok Han, Daejeon (KR); Young Keun Kim, Daejeon (KR); Gyu Ik Han, Daejeon (KR); In Keun Kang, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 167 days.

(21) Appl. No.: 15/776,443

(22) PCT Filed: Jun. 23, 2017

(86) PCT No.: PCT/KR2017/006652
§ 371 (c)(1),
(2) Date: May 16, 2018

(87) PCT Pub. No.: WO2018/004203
PCT Pub. Date: Jan. 4, 2018

(65) Prior Publication Data
US 2018/0326812 A1 Nov. 15, 2018

(30) Foreign Application Priority Data

Jun. 27, 2016 (KR) .................. 10-2016-0080042
Jun. 27, 2016 (KR) .................. 10-2016-0080074

(51) Int. Cl.
*B60H 1/00* (2006.01)

(52) U.S. Cl.
CPC ..... *B60H 1/00064* (2013.01); *B60H 1/00678* (2013.01); *B60H 1/00685* (2013.01);
(Continued)

(58) Field of Classification Search
CPC ............ B06H 1/00064; B06H 1/00678; B06H 1/00685; B06H 1/00692;
(Continued)

(56) References Cited

U.S. PATENT DOCUMENTS 5,181,553 A * 1/1993 Doi .................... B60H 1/00842
165/203
5,309,731 A * 5/1994 Nonoyama ........ B60H 1/00849
62/244
(Continued)

FOREIGN PATENT DOCUMENTS

JP 2001010327 A 1/2001
JP 2001270320 A 10/2001
(Continued)

OTHER PUBLICATIONS

International Search Report and Written Opinion dated Sep. 13, 2017 from International Patent Application Serial No. PCT/KR2017/006652, with English translation of International Search Report.

*Primary Examiner* — Kenneth J Hansen
*Assistant Examiner* — Dana K Tighe
(74) *Attorney, Agent, or Firm* — Dickinson Wright PLLC (57) ABSTRACT

Disclosed is an air conditioner for a vehicle. The present invention provides an air conditioner for a vehicle capable of introducing indoor air and outdoor air simultaneously or selectively by forming a double-layer flow in an air conditioner case and capable of separately controlling the temperatures of a front seat and a rear seat.

19 Claims, 7 Drawing Sheets

(52) U.S. Cl.
CPC ... *B60H 1/00692* (2013.01); *B60H 2001/002* (2013.01); *B60H 2001/00092* (2013.01); *B60H 2001/00135* (2013.01)

(58) Field of Classification Search
CPC ........... B60H 2001/00092; B60H 2001/00135; B60H 2001/002
USPC ........................................................ 454/121
See application file for complete search history.

(56) References Cited

U.S. PATENT DOCUMENTS

| | | | | |
|---|---|---|---|---|
| 6,145,754 | A * | 11/2000 | Uemura | B60H 1/00735 |
| | | | | 165/203 |
| 6,213,198 | B1 * | 4/2001 | Shikata | B60H 1/00478 |
| | | | | 165/202 |
| 6,352,102 | B1 * | 3/2002 | Takechi | B60H 1/00064 |
| | | | | 165/203 |
| 6,530,831 | B1 * | 3/2003 | Colinet | B60H 1/00207 |
| | | | | 454/121 |
| 6,782,944 | B2 * | 8/2004 | Kim | B60H 1/00064 |
| | | | | 165/202 |
| 6,874,575 | B2 * | 4/2005 | Kim | B60H 1/00064 |
| | | | | 165/204 |
| 8,511,371 | B2 * | 8/2013 | Onda | B60H 1/00685 |
| | | | | 165/202 |
| 9,102,214 | B2 * | 8/2015 | Kishi | B60H 1/00849 |
| 2005/0118944 | A1 * | 6/2005 | Vincent | B60H 1/00064 |
| | | | | 454/121 |
| 2007/0111651 | A1 * | 5/2007 | Sekito | B60H 1/00692 |
| | | | | 454/121 |
| 2010/0043470 | A1 * | 2/2010 | Kang | B60H 1/00064 |
| | | | | 62/239 |

FOREIGN PATENT DOCUMENTS

| | | |
|---|---|---|
| JP | 2003072344 A | 3/2003 |
| JP | 2011121488 A | 6/2011 |
| KR | 20070068566 A | 7/2007 |
| KR | 100745078 B1 | 8/2007 |
| KR | 20080076217 A | 8/2008 |
| KR | 20100005804 A | 1/2010 |
| KR | 20130124684 A | 11/2013 |

\* cited by examiner

FIG. 1

PRIOR ART

AIR CONDITIONER FOR VEHICLE

CROSS-REFERENCE TO RELATED APPLICATIONS

This application is a U.S. National Stage of International Application No. PCT/KR2017/006652, filed Jun. 23, 2017, which claims the benefit and priority of KR 10-2016-0080042 filed Jun. 27, 2016 and KR 10-2016-0080074 filed Jun. 27, 2016. The entire disclosures of each of the above applications are incorporated herein by reference.

TECHNICAL FIELD

The present invention relates to an air conditioner for a vehicle, and more particularly, to an air conditioner for a vehicle, which is capable of separately controlling temperatures of a front seat and a rear seat using a double-layer flow.

BACKGROUND ART

An air conditioner for a vehicle is a car part, which is installed in a vehicle for the purpose of cooling or heating the interior of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior of the vehicle through the steps of selectively introducing the indoor air or the outdoor air into the air conditioner, heating or cooling the introduced air, and blowing the heated or cooled air into the vehicle.

In general, in order to defrost a window of a vehicle, cold outdoor air is introduced into the interior of the vehicle. However, when the outdoor air is introduced into the interior of the vehicle to heat the interior of the vehicle and defrost the window, it causes reduction of temperature of indoor air. In order to solve the above-mentioned problem, an air conditioner for supplying a double-layer flow, namely, for supplying outdoor air to the window of the vehicle and supplying indoor air to the interior of the vehicle, has been developed.

Figure 1:
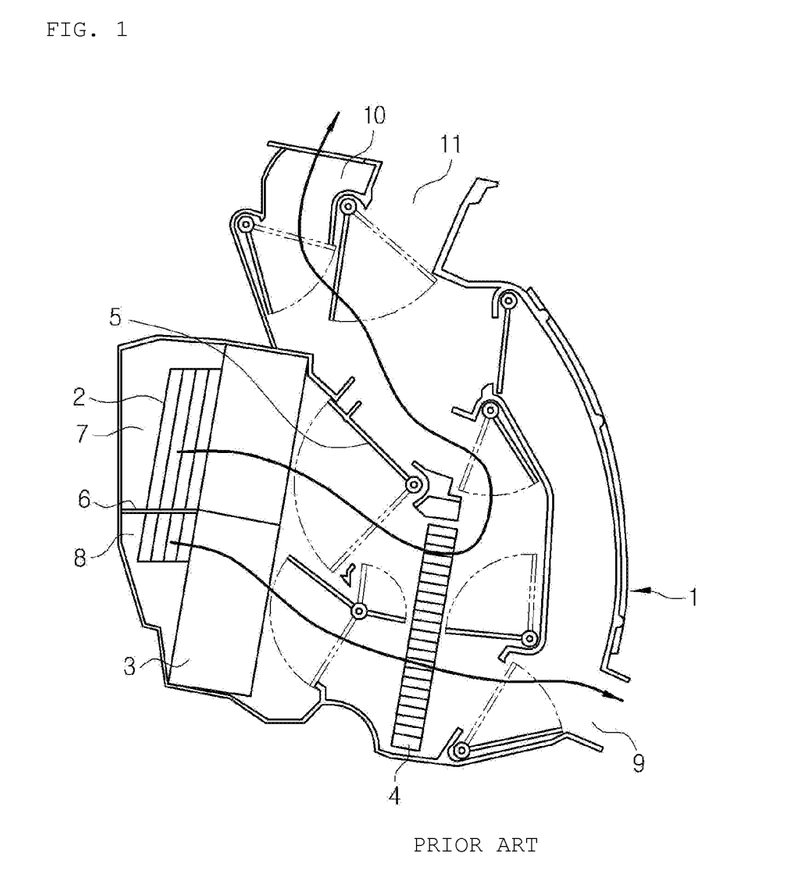
FIG. 1 is a sectional view showing an air conditioner for a vehicle according to a conventional art.

FIG. 1 is a view showing an air conditioner for a vehicle for supplying a double-layer flow according to a conventional art.

As shown in FIG. 1, the air conditioner for the vehicle according to the conventional art includes: an air-conditioning case 1; a blower unit 2 disposed inside the air-conditioning case 1 to run air; a cooling heat exchanger 3 for cooling air; and a heating heat exchanger 4 for heating air.

The cooling heat exchanger 3 and the heating heat exchanger 4 are spaced apart from each other and arranged in various ways. In this instance, the heat exchanger 4 is located lower than the cooling heat exchanger 3 on an air flow passageway.

Moreover, a temperature-adjusting door 5 for heating and cooling the interior of the vehicle to an appropriate temperature by properly mixing the air cooled by the cooling heat exchanger 3 and the air heated by the heating heat exchanger 4 is provided.

An air inlet is divided into an outdoor air inlet 7 and an indoor air inlet 8 by a partition 6. An air outlet includes a defrost vent 10 and a face vent 11 formed at an upper part of the air-conditioning case 1, and a floor vent 9 formed at a lower portion of the rear side of the air-conditioning case 1.

However, such a conventional air conditioner cannot separately carry out air-conditioning for a front seat and a rear seat because it does not have any outlet for air-conditioning of a rear seat. That is, the conventional air conditioner does not provide passengers sitting on the front seat and the rear seat with a desired indoor environment of the vehicle, so the passengers may feel inconvenience.

DISCLOSURE

Technical Problem

Accordingly, the present invention has been made in an effort to solve the above-mentioned problems occurring in the prior arts, and it is an object of the present invention to provide an air conditioner for a vehicle which can simultaneously or selectively induce indoor air and outdoor air by forming a double-layer flow inside an air-conditioning case and can separately control temperatures of a front seat and a rear seat.

TECHNICAL SOLUTION

To achieve the above objects, the present invention provides an air conditioner for a vehicle including: an air-conditioning case having air inlets; a cooling heat exchanger and a heating heat exchanger arranged inside the air-conditioning case in order to condition air introduced through the air inlets; a partition disposed to partition an inner space of the air-conditioning case into a first passageway and a second passageway; a front seat outlet of the vehicle having a defrost outlet for discharging air toward a window of the vehicle, a front-vent outlet for discharging the air toward an upper part of the front seat of the vehicle, and a front-floor outlet for discharging the air toward a lower part of the front seat of the vehicle; and a rear seat outlet of the vehicle for discharging air toward the rear seat of the vehicle, wherein the first passageway is located above the partition and communicates with the defrost outlet and the front-vent outlet, and the second passageway is located below the partition and communicates with the front-floor outlet and the rear seat outlet.

Moreover, the rear seat outlet includes: a rear-vent outlet which is formed below the partition and communicates with the second passageway to discharge the air toward an upper part of the rear seat of the vehicle; and a rear-floor outlet which is formed below the partition and communicates with the second passageway to discharge the air toward a lower part of the rear seat of the vehicle.

Furthermore, the partition includes: a first partition which partitions the inner space of the air-conditioning case into a first passageway and a second passageway and is located between the first and second inlets and the cooling heat exchanger; a second partition located between the cooling heat exchanger and the heating heat exchanger; and a third partition located between the heating heat exchanger and the inner wall of the air-conditioning case.

Additionally, the first partition partitions the air inlets into the first inlet and the second inlet located below the first inlet so that indoor air or outdoor air can be introduced into the air-conditioning case.

In addition, the cooling heat exchanger or the heating heat exchanger is arranged perpendicularly to the direction of the air introduced into the air inlets.

Moreover, the air-conditioning case has an air passageway, which is disposed at the rear side of an air flow path of the heating heat exchanger, and, with which the second passageway and the first passageway communicate, and the third partition includes a means for opening and closing the air passageway between the first passageway and the second passageway.

Furthermore, the third partition includes: a side door for selectively opening and closing the air passageway and the front-floor outlet; and a rear door for selectively opening and closing the air passageway and the rear-vent outlet.

Additionally, the air passageway is opened by any one of the rear door and the side door such that some of the air of the second passageway flows into the first passageway.

In addition, the first passageway is divided into a left passageway and a right passageway for an independent air-conditioning of the front seat, and the second passageway is divided into a central passageway communicating with the rear-vent outlet and a pair of side passageways arranged at both sides of the central passageway and communicating with the front-floor outlet.

Moreover, the side door selectively opens and closes the air passageway located between the side passageway and the first passageway, or the front-floor outlet.

Furthermore, the side door is rotatably arranged between the air passageway located between the side passageway and the first passageway and the front-floor outlet.

Additionally, the rear door selectively opens and closes the air passageway located between the central passageway and the first passageway, or the rear-vent outlet.

In addition, the rear door is rotatably arranged between the air passageway located between the central passageway and the first passageway and the rear-vent outlet.

Moreover, the air conditioner for the vehicle further includes: a first door located above the second partition for controlling a flow path so that the air passing the cooling heat exchanger passes or bypasses the heating heat exchanger; and a second door located below the second partition for controlling the flow path so that the air passing the cooling heat exchanger passes or bypasses the heating heat exchanger.

Furthermore, the first door or the second door is mounted to be movable between the second partition and the inner wall of the air-conditioning case, such that the air passing the cooling heat exchanger bypasses the heating heat exchanger when one side of the door touches the second partition.

Additionally, the a base line is formed in the horizontal direction of the air-conditioning case, and the cooling heat exchanger and the heating heat exchanger are mounted in the vertical direction of the air-conditioning case.

Moreover, the first partition, the second partition and the third partition are arranged along the base line in order.

Furthermore, the first passageway is located below the base line inside the air-conditioning case, and the second passageway is located above the base line inside the air-conditioning case.

Additionally, the defrost outlet and the front-vent outlet is located at the upper part and the front-floor outlet, the rear-vent outlet and the rear-floor outlet are located at the lower part based on the base line.

Advantageous Effects

The air conditioner for a vehicle according to an embodiment of the present invention can prevent frost, improve heating efficiency using the double-layer flow, and provide passengers with convenience as being capable of separately controlling temperatures of the front seat and the rear seat.

Moreover, the air conditioner for a vehicle according to an embodiment of the present invention can minimize its volume because it can separately control temperatures of the front seat and the rear seat, and effectively arrange the cooling heat exchanger, the heating heat exchanger, the double-layer flow, and the temperature-adjusting door inside the air-conditioning case.

MODE FOR INVENTION

Hereinafter, reference will be now made in detail to a preferred embodiment of the present invention with reference to the attached drawings.

Figure 2:
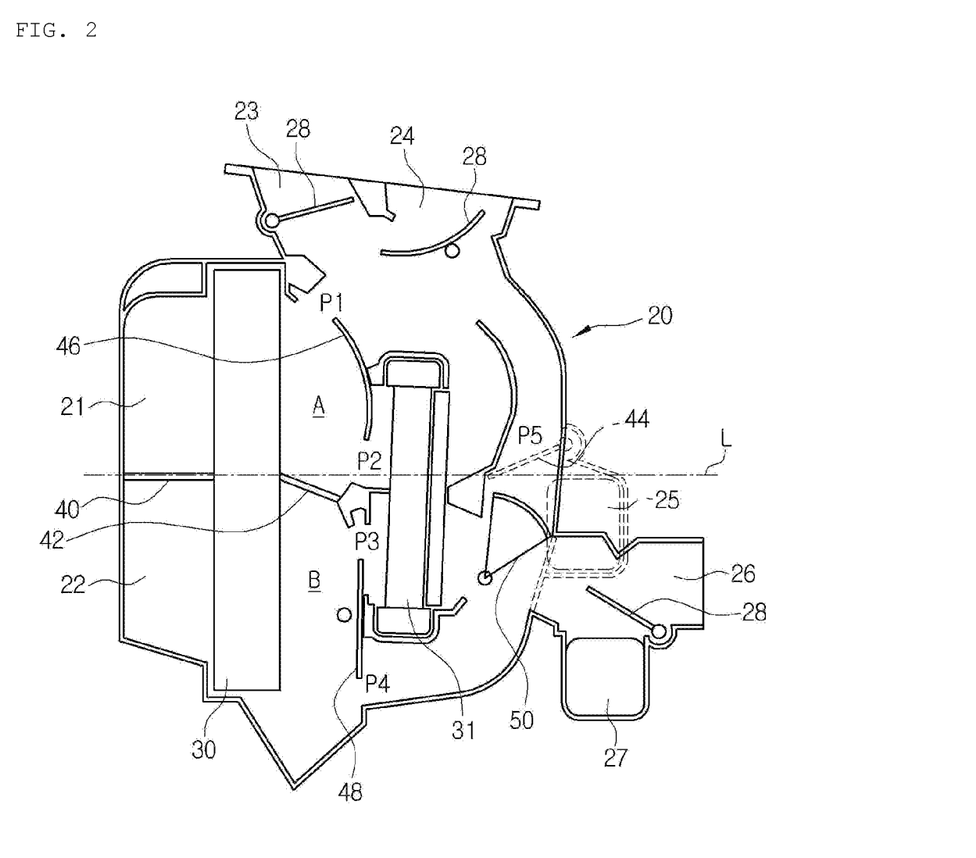
FIGS. 2 and 3 are views showing an air conditioner for a vehicle according to a preferred embodiment of the present invention.
Figure 3:
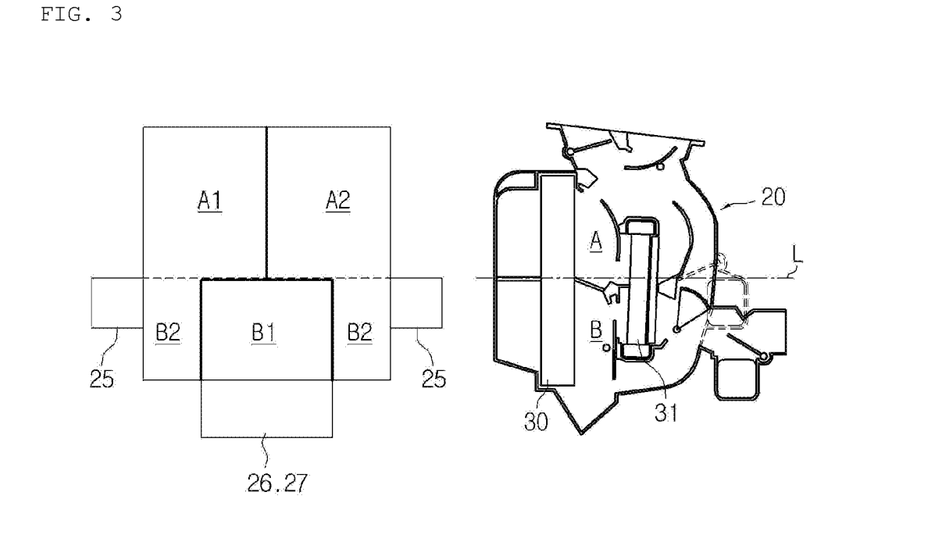

FIGS. 2 and 3 are views showing an air conditioner for a vehicle according to a preferred embodiment of the present invention, wherein FIG. 2 illustrates the side of the air conditioner, and FIG. 3 briefly illustrates the whole side of the air conditioner based on the side of FIG. 2.

As shown in FIG. 2, the air conditioner for the vehicle according to the preferred embodiment of the present invention includes an air-conditioning case 20 having an air inlet for introducing indoor air or outdoor air. Moreover, the air-conditioning case 20 has one or more air outlets, and the air outlets will be described later. Furthermore, the air-conditioning case 20 is formed by a left case and a right case which are assembled with each other.

An air blower (not shown) is mounted at the air inlet in one side of the air-conditioning case 20. In this instance, the air blower is not illustrated in the drawings, but has a blast fan (not shown) for blowing indoor air and/or outdoor air to the air inlet of the air-conditioning case 20 such that the indoor air and/or the outdoor air can be introduced into the air inlet.

The air inlet includes an indoor air inlet and an outdoor air inlet. In this instance, only the indoor air or the outdoor air is introduced into the air inlet by an indoor and outdoor air converting door (not shown) or the indoor air and the outdoor air are all introduced into the air inlet. That is, the indoor air or the outdoor air may be selectively introduced into a first inlet 21 and a second inlet 22, which are the air inlets illustrated in FIG. 2, by the indoor and outdoor air converting door of the air blower. Indoor air or outdoor air may be independently introduced into the first and second inlets 21 and 22. For instance, the first inlet 21 may be an indoor air inlet to which the indoor air is introduced, or an outdoor air inlet to which the outdoor air is introduced.

In general, a plurality of air outlets are formed inside the air-conditioning case 20 and are connected with ducts communicating with specific parts of the interior of the vehicle.

Therefore, cooled air or heated air can be discharged to the specific parts of the interior of the vehicle. For instance, the cooled air or the heated air may be discharged toward the front window of the vehicle, toward faces and feet of passengers sitting on a front seat, or toward faces and feet of passengers sitting on a rear seat.

The air conditioner for the vehicle according to the preferred embodiment of the present invention includes: a defrost outlet 23 for discharging air-conditioned air toward the window of the vehicle; a front vent outlet 24 for discharging air-conditioned air toward an upper part of the front seat of the vehicle; a front floor outlet 25 for discharging air-conditioned air toward a lower part of the front seat of the vehicle; a rear vent outlet 26 for discharging air-conditioned air toward an upper part of the rear seat of the vehicle; and a rear floor outlet 27 for discharging air-conditioned air toward a lower part of the rear seat of the vehicle.

In this instance, the defrost outlet 23, the front-vent outlet 24 and the front floor outlet 25 are called front seat outlets of the vehicle because communicating with the front seat of the vehicle. Additionally, the rear-vent outlet 26 and the rear floor outlet 27 are called rear seat outlets of the vehicle because communicating with the rear seat of the vehicle. In this instance, the defrost outlet 23 and the front-vent outlet 24 which are the front seat outlets are located at an upper part of the air-conditioning case 20, and the rear-vent outlet 26 and the rear-floor outlet 27 which are the rear seat outlets are located at a lower part of the rear of the air-conditioning case 20. In this instance, the front-floor outlet 25 is located at the side of the air-conditioning case (see FIG. 3). In more detail, the front-floor outlet 25 is located at lower parts of both sides of the air-conditioning case.

Each of the outlets has a door 28 for adjusting the degree of opening of each outlet. The door 28 may be formed in various shapes or may have a shape for selectively opening the plural outlets.

In order to condition the air introduced through the air inlet, a cooling heat exchanger 30 and a heating heat exchanger 31 are arranged inside the air-conditioning case 20. The cooling heat exchanger 30 is mounted on a refrigerant circulation line. So, the air passing through the cooling heat exchanger 30 according to circulation of refrigerant exchanges heat with refrigerant to be cooled.

The cooling heat exchanger 30 and the heating heat exchanger 31 are arranged to be spaced apart from each other inside the air-conditioning case 20. In this instance, the cooling heat exchanger 30 is arranged adjacent to the air inlet so that the air introduced through the air inlet first passes the cooling heat exchanger 30. The heating heat exchanger 31 is arranged at the rear of an air flow of the cooling heat exchanger 30 so that the air passing through the cooling heat exchanger 30 can be heated.

Moreover, the air conditioner for the vehicle includes a double-layer flow partition for supplying a double-layer flow. The double-layer flow partition extends in a horizontal direction of the air-conditioning case 20 to divide the inner space of the air-conditioning case 20 into an upper part and a lower part. Therefore, the double-layer partition partitions the inner space of the air-conditioning case 20 into a first passageway A located at the upper side of the inner space and a second passageway B located at the lower side.

Hereinafter, in the drawings, a horizontally extended line of the double-layer flow partition is called a 'base line L', and the base line L is indicated by an alternated long and short dash line. Such a horizontal direction is approximately parallel to the direction of the air introduced into the air-conditioning case 20. In the same sense, a passageway located above the base line L is called a first passageway A, and a passageway located below the base line L is called a second passageway B.

The base line L is formed in the horizontal direction (in FIG. 2) of the air-conditioning case 20, and the cooling heat exchanger 30 and the heating heat exchanger 31 are mounted in a vertical direction of the air-conditioning case 20. That is, the cooling heat exchanger 30 and the heating heat exchanger 31 are mounted perpendicularly to the direction that the air is introduced so as to widen a contact area with the air to maximize heat exchanging effects.

The defrost outlet 23 and the front-vent outlet 24 are located above the base line L, and the front-floor outlet 25, the rear-vent outlet 26 and the rear-floor outlet 27 are located below the base line L. In the same sense, the double-layer flow partitions 40, 42 and 44 are located below the defrost outlet 23 and the front-vent outlet 24 and above the front-floor outlet 25, the rear-vent outlet 26 and the rear-floor outlet 27.

In this instance, the double-layer flow partition includes a first partition 40, a second partition 42 and a third partition. The first partition 40 is located between the air inlet and the cooling heat exchanger 30, the second partition 42 is located between the cooling heat exchanger 30 and the heating heat exchanger 31, and the third partition is located between the heating heat exchanger 31 and the inner wall of the air-conditioning case 20.

Furthermore, the first passageway A located above the double-layer flow partitions 40, 42 and 44 is communicatingly connected with the defrost outlet 23 and the front-vent outlet 24 of the front seat outlets of the vehicle, and the second passageway B located below the double-layer flow partitions 40, 42 and 44 is communicatingly connected with the front-floor outlet 25 and the rear seat outlets 26 and 27 of the vehicle.

The first partition 40 partitions the air inlet into upper and lower parts in order to separate the air introduced through the air inlet. The air inlet is partitioned into a first inlet 21 and a second inlet 22 located below the first inlet 21 by the first partition 40. That is, the first inlet 21 communicates with the first passageway A, and the second inlet 22 communicates with the second passageway B.

The first inlet 21 and the second inlet 22 may independently introduce the indoor air and the outdoor air by the air blower and the indoor and outdoor air converting door. For example, the indoor air or the outdoor air may be introduced into all of the first inlet 21 and the second inlet 22. Alternatively, the outdoor air may be introduced into the first inlet 21 and the indoor air may be introduced into the second inlet 22.

Therefore, the air introduced through the first inlet 21 is introduced into the first passageway A after passing through an upper part of the cooling heat exchanger 30, and the air introduced through the second inlet 22 is introduced into the second passageway B after passing through a lower part of the cooling heat exchanger 30.

The second partition 42 closes an air passageway between the cooling heat exchanger 30 and the heating heat exchanger to partition the first passageway A from the second passageway B.

Additionally, temperature-adjusting doors 46 and 48 are arranged between the cooling heat exchanger 30 and the heating heat exchanger 31. The temperature-adjusting doors 46 and 48 are a first door 46 located above the second partition 42 and a second door 48 located below the second partition 42. That is, the first door 46 is located above the base line L and is disposed in the first passageway A, and the second door 48 is located below the base line L and is disposed in the second passageway B.

Such temperature-adjusting doors 46 and 48 control a flow path so that the air passing through the cooling heat exchanger 30 passes or bypasses the heating heat exchanger 31. In this instance, the temperature-adjusting door may be disposed in the vertical direction of the air-conditioning case 20 to control the flow path of the air flowing inside the air-conditioning case 20.

In detail, as shown in the drawings, the first door 46 and the second door 48 may be formed in a slide door type. For instance, the first door 46 may be a curved slide door and the second door 48 may be a vertically movable slide door. However, the above types are exemplary, and the first door 46 and the second door 48 may adopt various forms, and the present invention does not limit the forms of the first door 46 and the second door 48.

The first door 46 and the second door 48 may be mounted to be movable between the second partition 42 and the inner wall of the air-conditioning case 20. In detail, the first door 46 moves between the inner wall of the upper part of the air-conditioning case 20 and the second partition 42, and the second door 48 moves between the inner wall of the lower part of the air-conditioning case 20 and the second partition 42.

In case that one side of the first door 46 and one side of the second door 48 touch the second partition 42, the air passing through the cooling heat exchanger 30 bypasses the heating heat exchanger 31. That is, the first door 46 and the second door 48 blocks the flow path directing the heating heat exchanger 31 such that all of the air passing through the cooling heat exchanger 30 bypasses the heating heat exchanger 31.

Furthermore, in case that one side of the first door 46 and one side of the second door 48 touch the inner wall of the air-conditioning case 20, the air passing through the cooling heat exchanger 30 passes the heating heat exchanger 31. In other words, the first door 46 and the second door 48 blocks the flow path bypassing the heating heat exchanger 31 such that the air passing through the cooling heat exchanger 30 passes the heating heat exchanger 31.

In this instance, a first flow path P1 extends from the first passageway A and is formed between the first door 46 and the inner wall of the upper part of the air-conditioning case 20, and a second flow path P2 extends from the first passageway A and is formed between the first door 46 and the second partition 42. In the same way, a third flow path P3 extends from the second passageway B and is formed between the second door 48 and the second partition 42, and a fourth flow path P4 extends from the second passageway B and is formed between the second door 48 and the inner wall of the lower part of the air-conditioning case 20.

The first flow path P1 is disposed above the heating heat exchanger 31 to bypass the heating heat exchanger 31, and the second flow path P2 is disposed above the second partition 42 to pass the heating heat exchanger 31. Moreover, the third flow path P3 is disposed below the second partition 42 to pass the heating heat exchanger 31, and the fourth flow path P4 is disposed below the heating heat exchanger 31 to bypass the heating heat exchanger 31.

Additionally, an air passageway P5 which communicates with the second passageway B and the first passageway A is disposed at the rear side of the air flow path of the heating heat exchanger 31 inside the air-conditioning case 20.

The first door 46 closes/blocks the first flow path P1 or the second flow path P2 or opens all of the first flow path P1 and the second flow path P2. The second door 48 closes/blocks the third flow path P3 or the fourth flow path P4 or opens all of the third flow path P3 and the fourth flow path P4.

The third partition serves to open and close the air passageway P5 between the heating heat exchanger 31 and the inner wall of the air-conditioning case 20. Differently from the first partition 40 and the second partition 42 fixed in the air-conditioning case 20, the third partition may be mounted to be movable or rotatable. For instance, the third partition partially rotates to open and close the air passageway P5, and an end portion of the third partition is fixed on the inner wall of the air-conditioning case 20 to be rotatable.

In this instance, the third partition includes a rear door 50 which is a rotary door mounted in the middle part of the air-conditioning case 20, and a side door 44 which is a flat door mounted at both sides of the rear door 50. The structures and effects of the rear door 50 and the side door 44 will be described later in detail.

In the meantime, in case that the third partition closes the air passageway P5 between the heating heat exchanger 31 and the inner wall of the air-conditioning case 20, the third partition is located to be at an approximately level with the base line L. In this instance, the air introduced into the first inlet 21 which is located at the upper part of the first partition 40 is discharged to the defrost outlet 23 and the front-vent outlet 24, and the air introduced into the second inlet 22 which is located at the lower part of the first partition 40 is discharged to the front-floor outlet 25, the rear-vent outlet 26 and the rear-floor outlet 27.

In addition, in case that the third partition opens the air passageway P5 between the cooling heat exchanger 30 and the inner wall of the air-conditioning case 20, the air passing one of the first to fourth flow paths P1 to P4 is discharged to one of the defrost outlet 23, the front-vent outlet 24, the front-floor outlet 25, the rear-vent outlet 26 and the rear-floor outlet 27.

FIGS. 2 to 7 illustrate a cross section of the air conditioner for the vehicle according to the preferred embodiment of the present invention, wherein a part in which the rear door 50 is mounted is indicated by a solid line and a part in which the side door 44 is mounted is indicated by a dotted line.

Hereinafter, the third partition including the rear door 50 and the side door 44 will be described in detail.

The rear door 50 may be one of various rotatable doors, and for instance, may be a dome-shaped door. The rear door 50 includes a rotary shaft adjacent to the cooling heat exchanger 30 rather than the inner wall of the air-conditioning case 20, and a dome-shaped plate rotating according to the rotation of the rotary shaft.

Referring to FIG. 3, the air passageway P5 may be opened by one of the rear door 50 and the side door 44, and in this instance, some of the air of the second passageway B may flow into the first passageway A. The second passageway B includes a central passageway B1 communicating with the rear-vent outlet and the rear-floor outlet 27, and side passageways B2 communicating with the front-floor outlet 25. Therefore, the rear door 50 is arranged between the central passageway B1 and the first passageway A to be rotatable, and the side door 44 is arranged between the side passageway B2 and the first passageway A to be rotatable.

In detail, the rear door 50 rotates between the air passageway P5 and the rear seat outlets of the vehicle to selectively open and close them. That is, the rear door 50 is arranged to close the air passageway P5 and open the rear seat outlets of the vehicle so that the air-conditioned air is discharged out through the rear-vent outlet 26 and the rear-floor outlet 27.

Moreover, the rear door 50 may be arranged to close the rear seat outlets of the vehicle and open the air passageway P5 so that the air-conditioned air does not flow to the rear seat of the vehicle. In other words, the rear door 50 guides the air flowing from the second passageway B to the first passageway A along the air passageway P5 in case that the rear door 50 opens the air passageway P5. Such a principle will be described in detail in FIG. 7.

The side door 44 selectively opens and closes the air passageway P5 and the front-floor outlet 25 while rotating between the air passageway P5 and the front-floor outlet 25. That is, the side door 44 may be arranged to close the air passageway P5 and open the front-floor outlet 25 so that the air-conditioned air is discharged out through the front-floor outlet 25.

Furthermore, the rear door 50 and the side door 44 may adjust the degree of opening to partially open the outlets and the air passageway P5. The rear door 50 and the side door 44 operate independently to open the outlets 25, 26 and 27.

Particularly, because the side door 44 can open the air passageway P5 or close the front-floor outlet 25, for a smooth operation, the front-floor outlet 25 may be disposed at one side of the side door 44. In other words, the front-floor outlet 25 may be disposed at one side of the third partition. Preferably, the front-floor outlet 25 is disposed at a lower part of the third partition and communicates with the second passageway B.

In the same way, because the rear door 50 can open the air passageway P5 or close the rear-vent outlet 26 and the rear-floor outlet 27, for a smooth operation, the rear-vent outlet 26 and the rear-floor outlet 27 may be disposed at one side of the rear door 50. In other words, the rear-vent outlet 26 and the rear-floor outlet 27 may be disposed at one side of the third partition.

Therefore, the air conditioner for the vehicle according to the preferred embodiment of the present invention is characterized in that the front-floor outlet 25 and the rear seat outlets are arranged on the same line in the vehicle width direction.

Additionally, the air conditioner for the vehicle according to the preferred embodiment of the present invention can provide the driver's seat and the passenger's seat, which are the front seats of the vehicle, with air-conditioned air because the first passageway A is divided into the left passageway A1 and the right passageway A2.

The inside of the air-conditioning case may be partitioned into five zones: the left passageway A1 of the first passageway A; the right passageway A2; the central passageway B1 of the second passageway B; and a pair of the side passageways B2.

In other words, the first passageway A includes the left passageway A1 and the right passageway A2, and the second passageway B includes the central passageway B1 communicating with the rear-vent outlet 26 and the rear-floor outlet 27, and the side passageways B2 communicating with the front-floor outlet 25.

Hereinafter, based on the above description, various modes of the air conditioner for the vehicle according to the preferred embodiment of the present invention will be described. Such modes are exemplary, and other various modes besides the modes described in the following contents may be realized.

Figure 4:
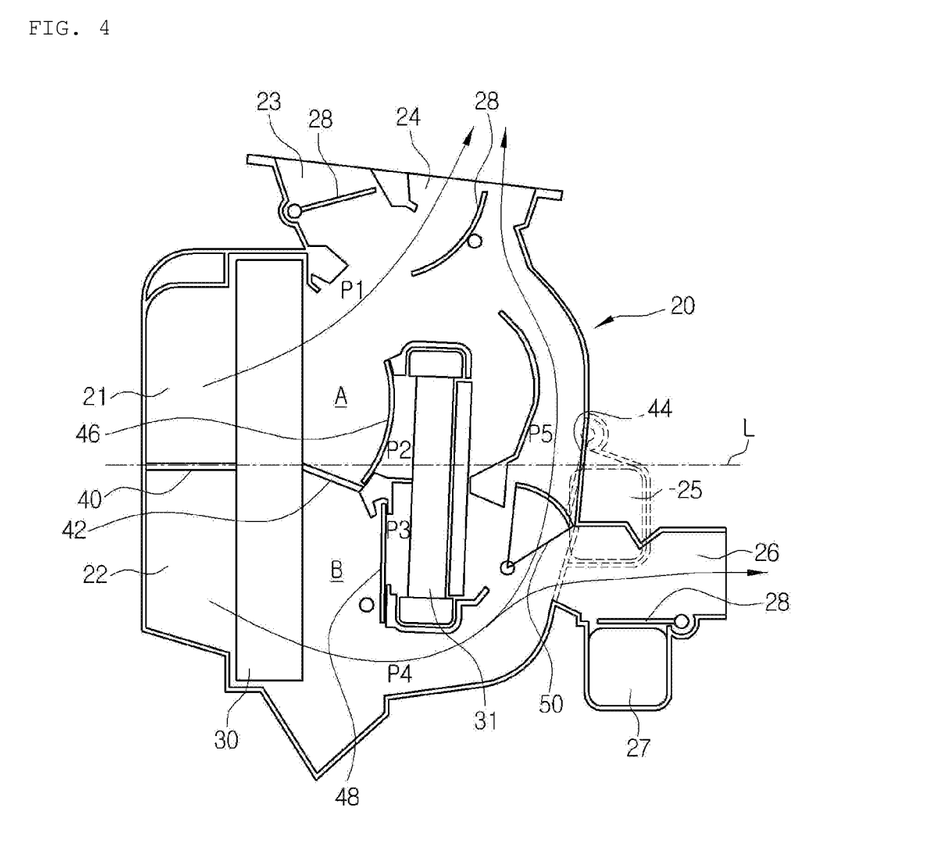
FIG. 4 is a sectional view showing a vent mode of the air conditioner for the vehicle according to the preferred embodiment of the present invention.

FIG. 4 is a sectional view showing a vent mode of the air conditioner for the vehicle according to the preferred embodiment of the present invention. The vent mode is a mode for rapidly cooling the interior of the vehicle after a passenger gets into the vehicle in the summer.

As shown in FIG. 4, the air introduced into the air inlet of the air-conditioning case 20 may be outdoor air or indoor air, but air with low temperature out of the outdoor air and the indoor air is used for rapid cooling. For instance, in case that the indoor air of the vehicle is higher in temperature than the outdoor air, the outdoor air is introduced through all of the first inlet 21 and the second inlet 22. So, the outdoor air flows into the first passageway A and the second passageway B.

The air introduced into the air-conditioning case 20 through the first inlet 21 and the second inlet 22 exchanges heat with the cooling heat exchanger 30. In this instance, the first door 46 and the second door 48 opens the first flow path P1 and the fourth flow path P4 so that the air bypasses the heating heat exchanger 31 for the maximum heating, and closes the second flow path P2 and the third flow path P3 passing the heating heat exchanger 31. That is, one side of the first door 46 and one side of the second door 48 moves to touch the second partition 42.

Therefore, all of the air passing through the cooling heat exchanger 30 bypasses the heating heat exchanger 31. In this instance, the rear door 50 rotates to open the rear seat outlets of the vehicle and the side door 44 rotates to open the air passageway P5. Therefore, some of the air of the second passageway B flows into the first passageway A. In this instance, the doors 28 rotate to open the front-vent outlet 24 and the rear-vent outlet 26.

Accordingly, the air passing the cooling heat exchanger 30 is supplied to the upper part of the front seat and the upper part of the rear seat of the vehicle through the front-vent outlet 24 and the rear-vent outlet 26. The air supplied to the upper part of the vehicle can rapidly cool the interior of the vehicle. Moreover, when the side door 44 of the third partition opens the air passageway P5, even though there is no passenger on the rear seat or there are one or two few passengers on the rear seat, the air conditioner can supply the maximum wind volume.

Figure 5:
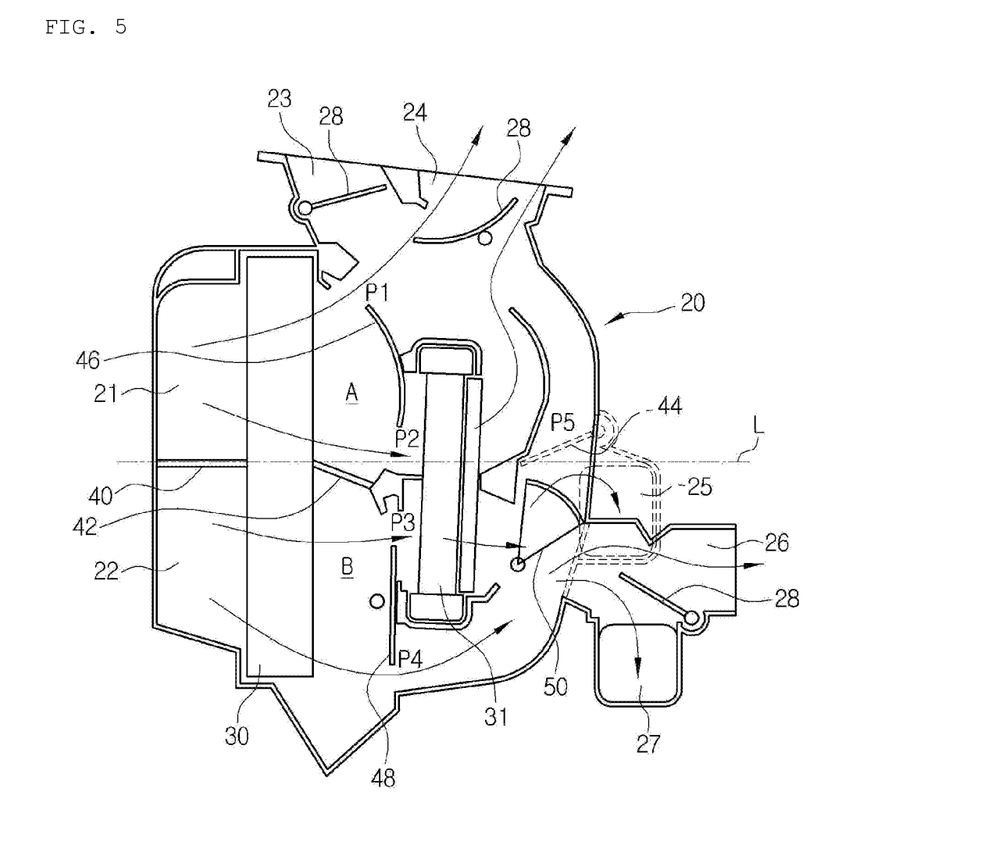
FIG. 5 is a sectional view showing a mixing mode of the air conditioner for the vehicle according to the preferred embodiment of the present invention.

FIG. 5 is a sectional view showing a mixing mode of the air conditioner for the vehicle according to the preferred embodiment of the present invention. The mixing mode is generally a cooling and heating mode, and the air introduced into the air-conditioning case 20 may use outdoor air or indoor air as occasion demands.

As shown in FIG. 5, the first door 46 and the second door 48 open the flow paths according to the passenger's need to provide the air conditioned according to target temperature. The first door 46 and the second door 48 are located between the inner wall of the air-conditioning case 20 and the second partition 42 so that some of the air passing through the cooling heat exchanger 30 bypasses the heating heat exchanger 31 and some of the air passes the heating heat exchanger 31.

In this instance, as occasion demands, the door 28 adjust the degree of opening of the front-vent outlet 23, the front-floor outlet 24, the rear-vent outlet 25, and the rear-floor outlet 26.

In addition, when the third partition closes the air passageway P5, the passenger sitting on the front seat and the passenger sitting on the rear seat are provided with different kinds of conditioned airs.

Figure 6:
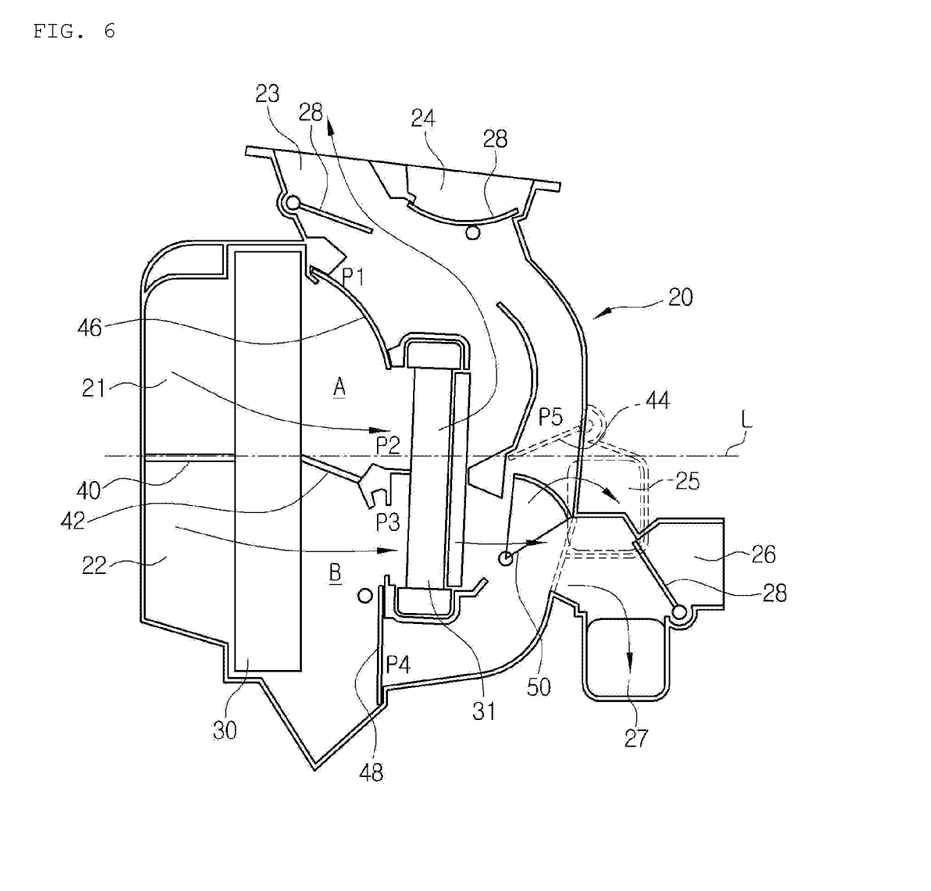
FIG. 6 is a sectional view showing a double-layer flow mode of the air conditioner for the vehicle according to the preferred embodiment of the present invention.

FIG. 6 is a sectional view showing a double-layer flow mode of the air conditioner for the vehicle according to the preferred embodiment of the present invention. The double-layer flow mode is a mode for preventing frost on the window of the vehicle in the winter in the maximum heating mode.

As shown in FIG. 6, it is effective to use indoor air with relatively high temperature for rapid heating of the vehicle in the winter. However, the indoor air may cause frost on the window of the vehicle because containing lots of moisture. In this instance, in order to rapidly heat the interior of the vehicle, outdoor air which does not have lots of moisture is supplied toward the window and the indoor air with high temperature is supplied toward the passenger.

For this, the outdoor air is introduced through the first inlet 21, and the indoor air is introduced through the second inlet 22. That is, the outdoor air flows in the first passageway A, and the indoor air flows in the second passageway B.

The air introduced into the air-conditioning case 20 through the first inlet 21 and the second inlet 22 exchanges heat with the cooling heat exchanger 30. In this instance, for the maximum heating, the first door 46 and the second door 48 open the second flow path P2 and the third flow path P4, which pass the heating heat exchanger 31, and close the first flow path P1 and the fourth flow path P4, which bypass the heating heat exchanger 31. As shown in FIG. 6, one side of the first door 46 and one side of the second door 48 move to meet the inner surface of the air-conditioning case 20.

Therefore, all of the air passing through the cooling heat exchanger 30 passes the heating heat exchanger 31. In this instance, the door 28 opens the defrost outlet 23, the front-floor outlet 25, and the rear-floor outlet 27. Moreover, the third partition closes the air passageway P5 between the heating heat exchanger 31 and the inner wall of the air-conditioning case 20 to prevent the indoor air and the outdoor air from being mixed together.

Therefore, the outdoor air passing the cooling heat exchanger 30 and the heating heat exchanger 31 is supplied to the window of the vehicle through the defrost outlet 23, and the indoor air passing the cooling heat exchanger 30 and the heating heat exchanger 31 is supplied to the lower part of the front seat and the lower part of the rear seat of the vehicle through the front-floor outlet 25 and the rear-floor outlet 27.

The air supplied to the lower part of the vehicle rapidly heats the interior of the vehicle, and the air supplied to the window prevents frost on the window.

Figure 7:
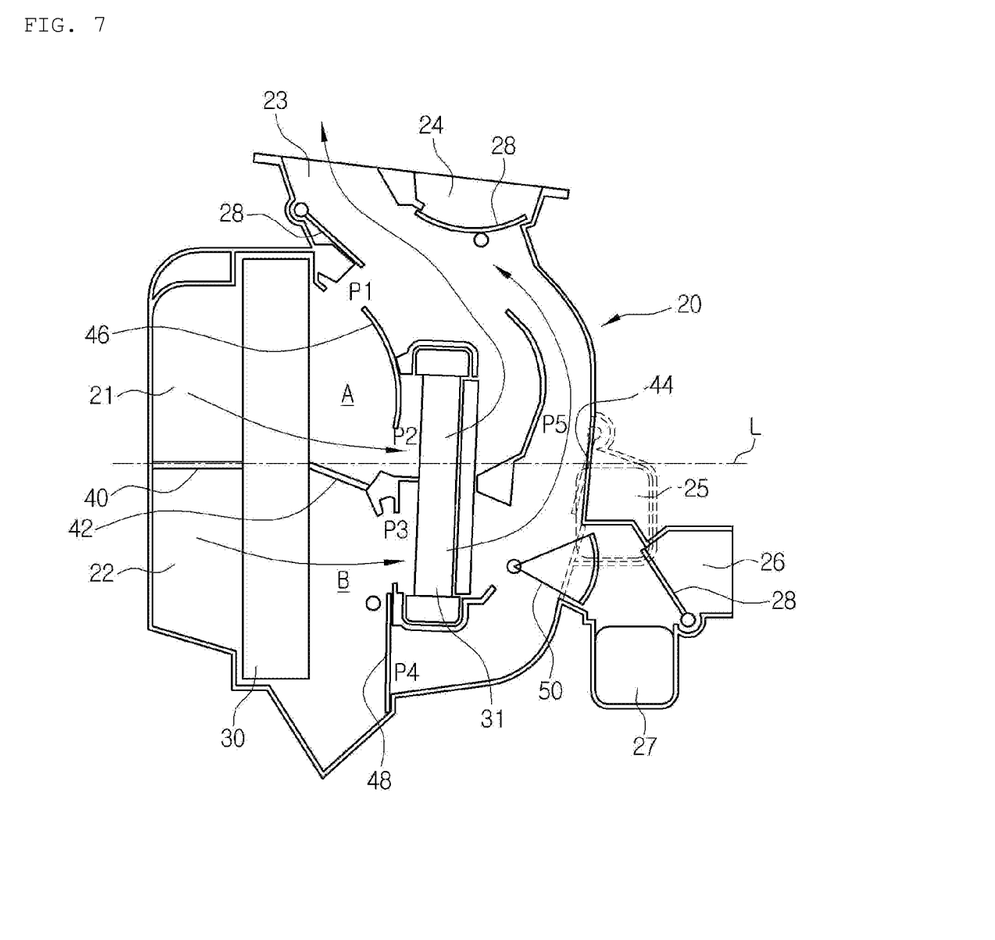
FIG. 7 is a sectional view showing a defrost mode of the air conditioner for the vehicle according to the preferred embodiment of the present invention.

FIG. 7 is a sectional view showing a defrost mode of the air conditioner for the vehicle according to the preferred embodiment of the present invention.

The defrost mode is a mode that does not heat or cool the interior of the vehicle but prevents frost on the window. Therefore, the outdoor air is introduced through the first inlet 21 and the second inlet 22 and passes the cooling heat exchanger 30 and the heating heat exchanger 31.

The door 28 opens the defrost outlet 23 to discharge the air passing the heating heat exchanger 31. In this instance, the third partition opens the air passageway P5 to discharge the air passing the third flow path P3 through the defrost outlet 23.

In this instance, the rear door 50 of the third partition guides the air flowing from the second passageway B to the first passageway A along the air passageway P5. Furthermore, the rear door 50 may be a dome-shaped plate curved at a predetermined angle, and closes the rear-vent outlet 26 and the rear-floor outlet 27 and opens the air passageway P5 such that the air of the second passageway B moves to the air passageway P5.

As described above, while the present invention has been particularly shown and described with reference to the example embodiment thereof, it will be understood by those of ordinary skill in the art that the present invention is not limited to the example embodiment and various changes, modifications and equivalents may be made therein without departing from the technical idea and scope of the present invention described in the following claims.

The invention claimed is:

1. An air conditioner for a vehicle comprising:
   an air-conditioning case having first and second air inlets;
   a cooling heat exchanger and a heating heat exchanger arranged inside the air-conditioning case in order to condition air introduced through the first and second air inlets;
   a partition disposed to partition an inner space of the air-conditioning case into a first passageway and a second passageway;
   a front seat outlet of the vehicle having a defrost outlet for discharging air toward a window of the vehicle, a front-vent outlet for discharging the air toward an upper part of a front seat of the vehicle, and a front-floor outlet for discharging the air toward a lower part of the front seat of the vehicle;
   a rear seat outlet of the vehicle including a rear-vent outlet for discharging air toward a rear seat of the vehicle;
   wherein the partition includes a side door for selectively opening and closing the front-floor outlet, and a rear door for selectively opening and closing the rear-vent outlet,
   wherein the partition includes a first partition located between the first and a second air inlets and the cooling heat exchanger, and a second partition located between the cooling heat exchanger and the heating heat exchanger;
   a first door located above the second partition and moveable between a first position in which the air in the first passageway flows along the heating heat exchanger and a second position in which the air in the first passageway bypasses the heating heat exchanger;
   a second door located below the second partition and moveable between a first position in which the air in the second passageway flows along the heating heat exchanger and a second position in which the air in the second passageway bypasses the second heat exchanger;
   wherein the first passageway is located above the partition and communicates with the defrost outlet and the front-vent outlet;
   wherein the second passageway is located below the partition and communicates with the front-floor outlet and the rear seat outlet;
   wherein in a vent mode, the side door closes the front-floor outlet and opens the rear-vent outlet, and the first and second doors are located in the second positions such that the air passing through the cooling heat exchanger bypasses the heating heat exchanger and passes through the first and second passageways and is supplied into inside the vehicle through the front vent outlet and the rear-vent outlet.

2. The air conditioner according to claim 1, wherein the rear-vent outlet is formed below the partition and communicates with the second passageway to discharge the air toward an upper part of the rear seat of the vehicle; and
   wherein the rear seat outlet further includes a rear-floor outlet which is formed below the partition and communicates with the second passageway to discharge the air toward a lower part of the rear seat of the vehicle.

3. The air conditioner according to claim 2, wherein the partition further comprises:

a third partition located between the heating heat exchanger and an inner wall of the air-conditioning case.

4. The air conditioner according to claim 3, wherein the first partition partitions the first and second air inlets, and the second inlet is located below the first inlet so that indoor air or outdoor air can be introduced into the air-conditioning case.

5. The air conditioner according to claim 3, wherein the air-conditioning case has an air passageway, which is disposed at a rear side of an air flow path of the heating heat exchanger, and, with which the second passageway and the first passageway communicate, and wherein the third partition includes a means for opening and closing the air passageway between the first passageway and the second passageway.

6. The air conditioner according to claim 5, wherein the third partition comprises:

a side door for selectively opening and closing the air passageway and the front-floor outlet and a rear door for selectively opening and closing the air passageway and the rear-vent outlet.

7. The air conditioner according to claim 6, wherein the air passageway is opened by any one of the rear door and the side door such that some of the air of the second passageway flows into the first passageway.

8. The air conditioner according to claim 6, wherein the first passageway is divided into a left passageway and a right passageway for an independent air-conditioning of the front seat, and wherein the second passageway is divided into a central passageway communicating with the rear-vent outlet and a pair of side passageways arranged at both sides of the central passageway and communicating with the front-floor outlet.

9. The air conditioner according to claim 8, wherein the side door selectively opens and closes the air passageway located between the pair of side passageways and the first passageway, or the front-floor outlet.

10. The air conditioner according to claim 9, wherein the side door is rotatably arranged between the air passageway located between the pair of side passageways and the first passageway and the front-floor outlet.

11. The air conditioner according to claim 8, wherein the rear door selectively opens and closes the air passageway located between the central passageway and the first passageway, or the rear-vent outlet.

12. The air conditioner according to claim 11, wherein the rear door is rotatably arranged between the air passageway located between the central passageway and the first passageway and the rear-vent outlet.

13. The air conditioner according to claim 6, wherein the first door or the second door is mounted to be movable between the second partition and the inner wall of the air-conditioning case, such that the air passing the cooling heat exchanger bypasses the heating heat exchanger when one side of the door touches the second partition.

14. The air conditioner according to claim 3, wherein a base line is formed in a horizontal direction of the air-conditioning case, and wherein the cooling heat exchanger and the heating heat exchanger are mounted in a vertical direction of the air-conditioning case.

15. The air conditioner according to claim 14, wherein the first partition, the second partition and the third partition are arranged along the base line in order.

16. The air conditioner according to claim 14, wherein the first passageway is located below the base line inside the air-conditioning case, and wherein the second passageway is located above the base line inside the air-conditioning case.

17. The air conditioner according to claim 14, wherein the defrost outlet and the front-vent outlet are located at the upper part, and the front-floor outlet, the rear-vent outlet and the rear-floor outlet are located at the lower part based on the base line.

18. The air conditioner according to claim 1, wherein at least one of the cooling heat exchanger and the heating heat exchanger is arranged perpendicularly to a direction of the air introduced into the first and second air inlets.

19. The air conditioner according to claim 1, wherein the front-floor outlet and the rear seat outlet are arranged on a same line in a vehicle width direction.

* * * * *